3,157,192
SPACE KITCHEN
Warren R. Hafstrom, New Carlisle, Ind., and Lester H. Hinkel, Benton Harbor, and George Boswinkle, St. Joseph, Mich., assignors to Whirlpool Corporation, a corporation of Delaware
Filed Dec. 27, 1961, Ser. No. 162,506
9 Claims. (Cl. 137—341)

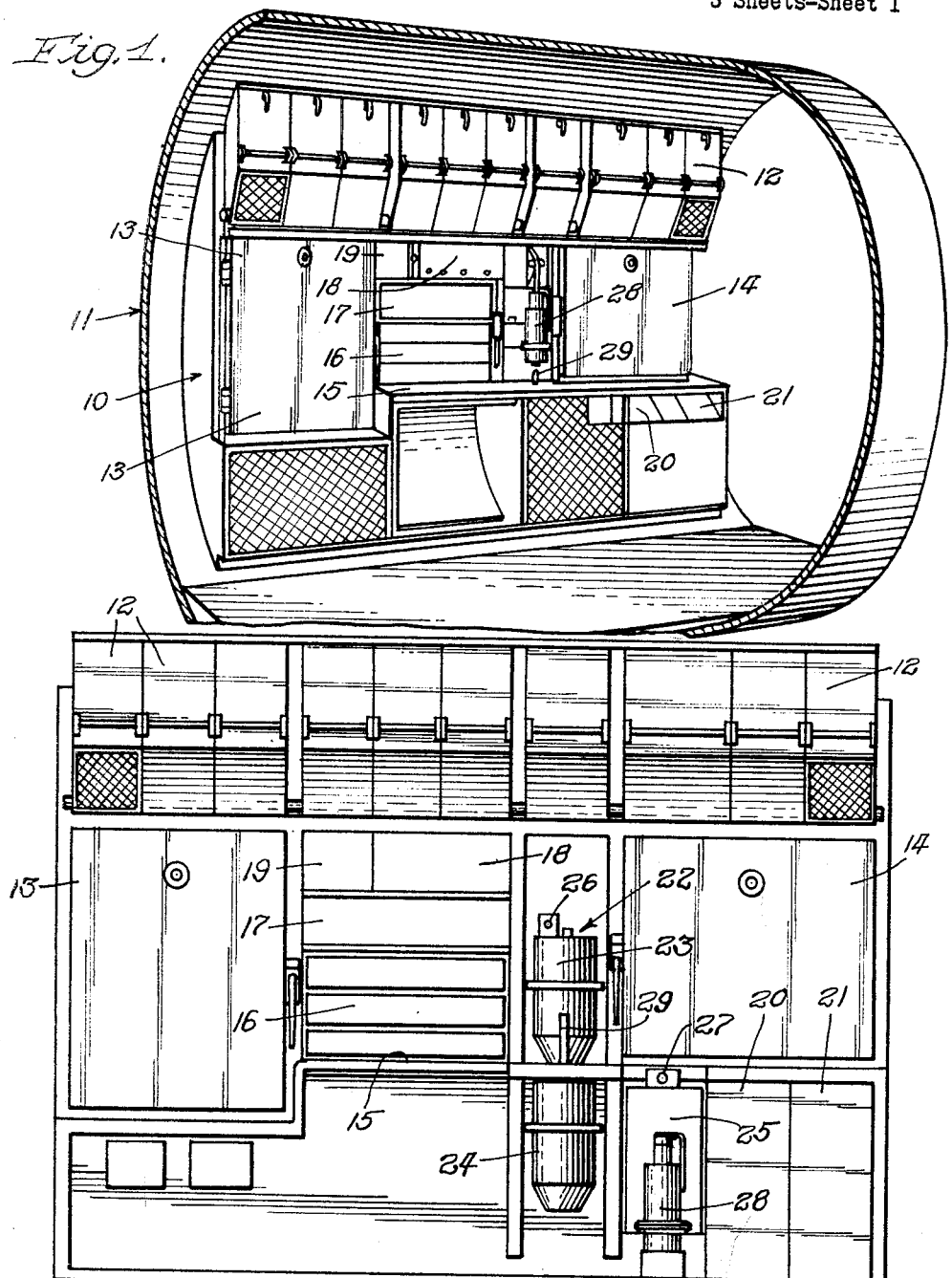

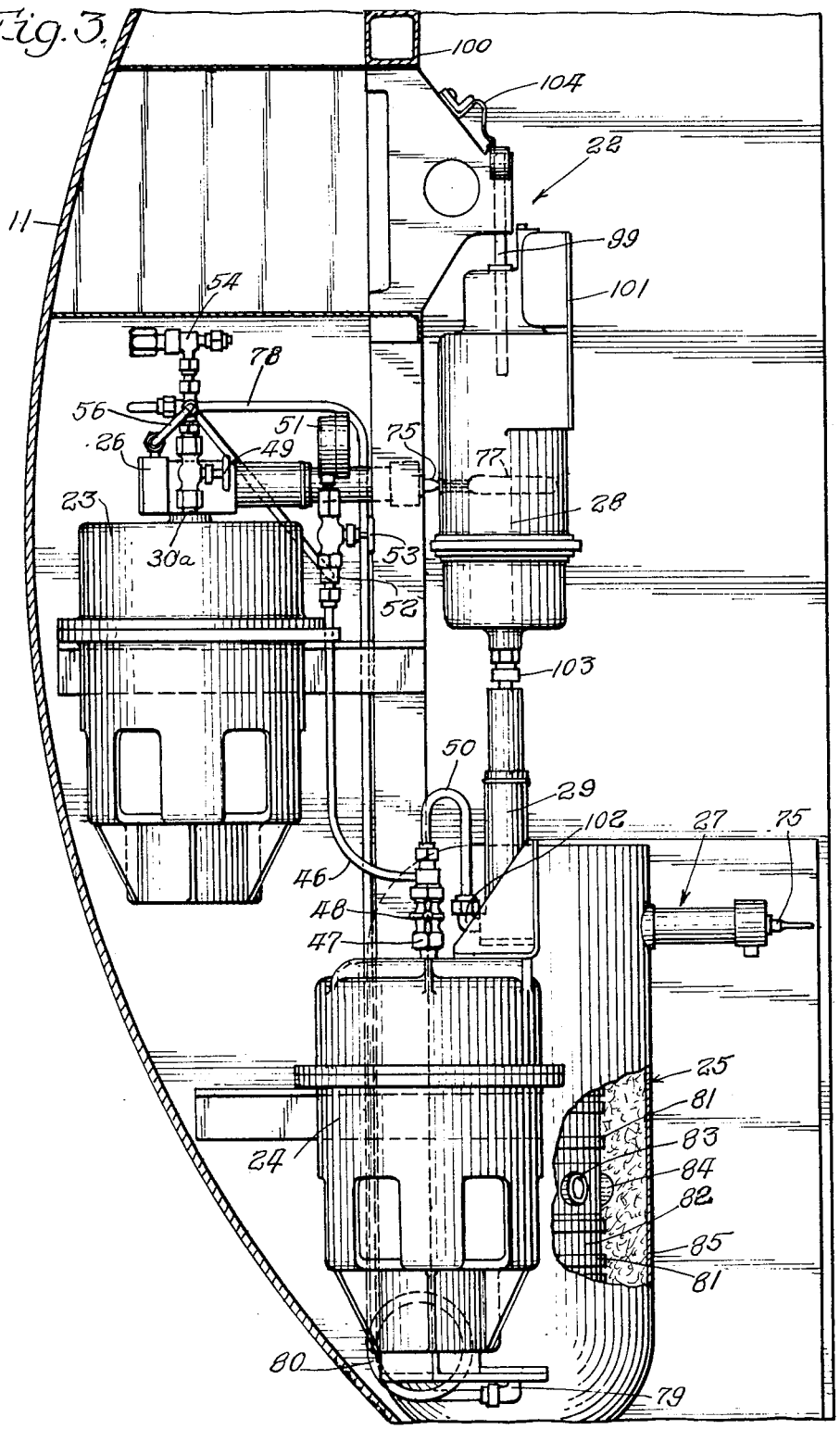

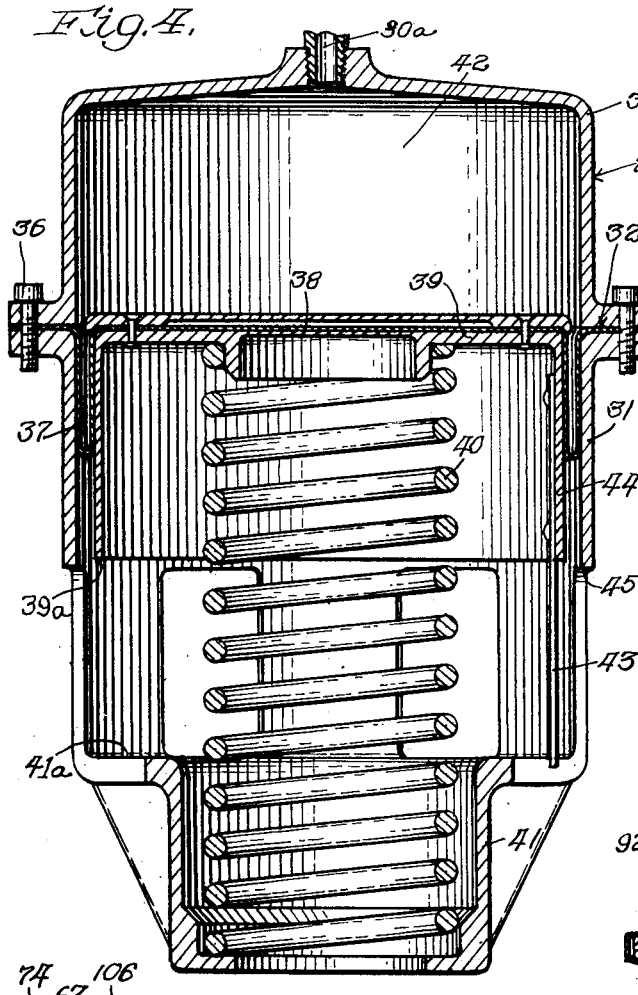
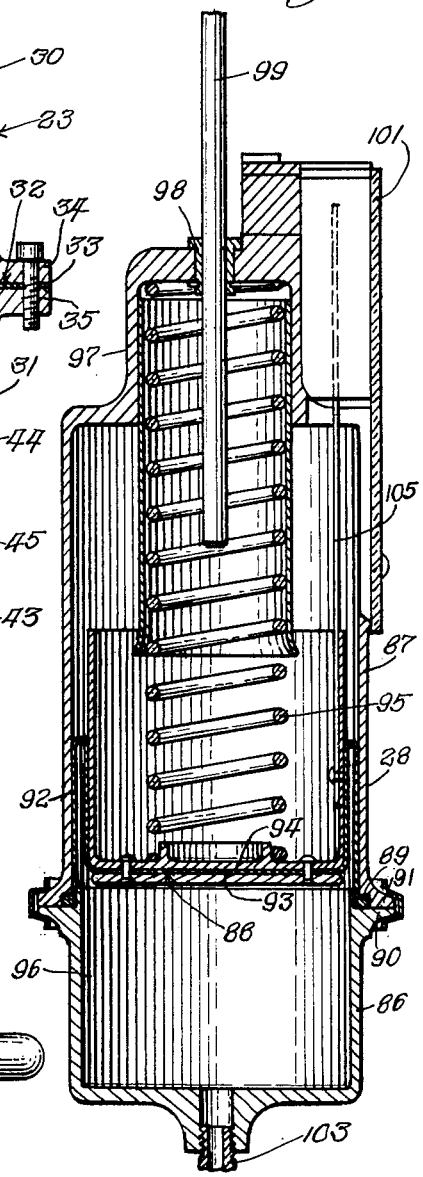
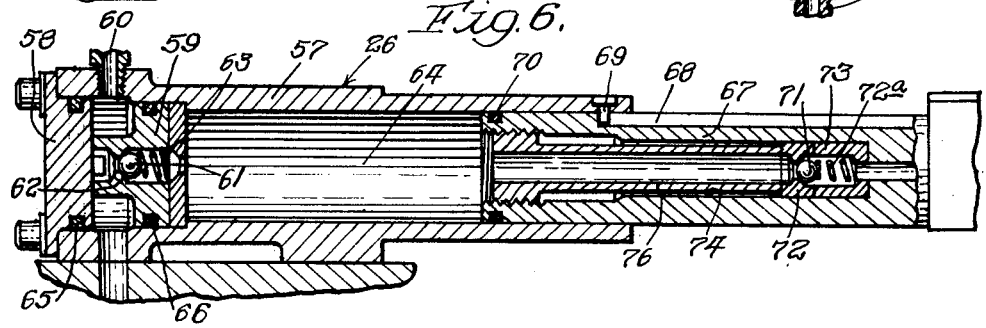

This invention relates to water supply systems and in particular to water supply systems for use in space vehicles and the like.

In manned space vehicles and the like, a serious problem arises in the providing of water for use by the astronaut as for drinking and as for use in preparing dehydrated foods and the like for consumption. It is desirable to have available at all times both heated and unheated water for use by the astronaut. Because of weight restrictions, the water system must be extremely efficient while yet of relatively small size and weight. To minimize the total quantity of water which must be carried by the space vehicle, it is contemplated that waste recovery systems and the like may be employed for reuse of the water. Thus, the water system must be capable of recharging under conditions as may exist with zero gravity and reduced space vehicle air pressure conditions of space flight.

Another problem encountered, where such a water system is utilized in environment wherein zero gravity and reduced air pressure conditions may exist, is the necessity for maintaining the system completely closed at all times to preclude the dispersion of water into the atmosphere within the space vehicle. This problem is complicated by the fact that due to the absence of gravity heads in the water supply system under zero gravity conditions, positive pressure producing means must be incorporated in the system to maintain the water therein under positive pressure at all times. Thus, even small leaks in the system may comprise serious hazards, potentially dispersing water droplets into the atmosphere which, under zero gravity conditions, are extremely difficult to remove.

The present invention comprehends a new and improved water system for use in environments such as space vehicles which solves the above discussed problems in a novel and simple manner. Thus, a principal feature of the invention is the provision of a new and improved water supply system for use in space vehicles and the like.

Another feature of the invention is the provision of such a water supply system which is extremely light and which provides effectively maximum efficiency in the utilization of a minimum essential water supply.

Still another feature of the invention is the provision of such a water supply system arranged for facilitated recharging and for facilitated dispensing of the water from the system as desired.

A further feature of the invention is the provision of such a water supply system having a new and improved means for providing hot water arranged to preclude damage thereto as a result of a failure of convective cooling of the hot water tank by the water being heated.

A yet further feature of the invention is the provision of such a water supply system having new and improved means for dispensing the water from the system as desired including means for effectively precluding inadvertent dispensing to the atmosphere.

Still another feature of the invention is the provision of such a water supply system having new and improved means for selectively transferring the water pumped from the system directly into the astronaut's mouth or into a container in which the water is to be utilized.

Other features and advantages of the invention will be apparent from the following description, taken in connection with the accompanying drawing wherein:

FIG. 1 is a fragmentary perspective view of a space vehicle having a kitchen installation therein provided with a water supply system embodying the invention;

FIG. 2 is a front elevation of the kitchen;

FIG. 3 is an enlarged side elevation of the water supply system as installed in the space vehicle;

FIG. 4 is a diametric vertical section of a water storage tank thereof;

FIG. 5 is a diametric vertical section of the means for recharging the water supply system;

FIG. 6 is a fragmentary longitudinal diametric section of the means for pumping water from the supply system; and FIG. 7 is a fragmentary diametric section of the distal end portion of the pumping means of FIG. 6.

In the exemplary embodiment of the invention as disclosed in the drawing, a space kitchen generally designated 10 is shown installed in a portion of a space vehicle 11 herein illustrated as comprising a metal cylinder. The space kitchen is arranged to satisfy the feeding requirements for three astronauts for a fourteen day period. The kitchen includes a plurality of bunkers 12 for storing dehydrated and canned foods and the like, a food freezer 13, and a refrigerator 14. The person utilizing the kitchen is seated at a counter 15 directly behind which is a plurality of feeding trays 16. Directly above the trays 16 is a mouthpiece storage compartment 17 and directly above the compartment 17 is an oven 18 wherein foodstuffs may be suitably heated in the preparation of meals. A glove storage space 19 is disposed to the left of the oven 18. Waste storage compartments 20 and 21 are provided below the refrigerator 14 for storing dry waste and wet waste, respectively.

As indicated briefly above, the present invention comprehends an improved water supply system generally designated 22 which, as best seen in FIG. 2, is disposed directly to the left of the refrigerator 14, a portion of the system being disposed below the counter 15. More specifically, the water supply system 22 includes a pair of water storage tanks 23 and 24 and a hot water tank 25. A cold water outlet 26 is disposed at the top of the upper water storage tank 23 and a hot water outlet 27 is disposed at the upper end of the hot water tank 25. For periodic recharging of the water supply system, a water transfer tank 28 is provided which is normally stored below counter 15 in front of the hot water tank 25 as shown in FIG. 2. During the recharging of the water supply system 22, the water transfer tank 28 is connected to an inlet pump 29 which extends upwardly through counter 15 as shown in FIG. 1. In the illustrated embodiment, the water supply system is arranged to have a capacity of approximately 3.75 gallons which, with suitable regeneration of the water by means of a waste recovery system (not shown), has been found to be sufficient to maintain a crew of three astronauts for a period of fourteen days.

For a more detailed disclosure of the water supply system 22, reference may be had to FIGS. 3-6. The water storage tanks 23 and 24 are shown to comprise similar tanks so that reference will be had solely to the detailed structure of tank 23, it being understood that a similar description applies to tank 24. Thus, as best seen in FIG. 4, water storage tank 23 includes an upper, downwardly opening cup-shaped housing 30 and a lower, upwardly opening complementary cup-shaped housing 31. A diaphragm 32 extends across the space defined by the function of members 30 and 31 and includes a peripheral portion 33 clamped between an outturned flange 34 on upper member 30 and an outturned flange 35 on lower member 31 by suitable means such as bolts 36. The diaphragm 32 further includes an elongated connecting portion 37 and a mid-portion 38 carried on a backing plate 39 which is urged upwardly by means of a coil spring 40 seated in a well portion 41 of the lower cup-shaped member 31. At the top of the upper cup-shaped member 30 is provided a fitting 30a defining the inlet and outlet to the space 42 above diaphragm 32 within cup-shaped member 30 whereby water under pressure may be delivered to or discharged from the space 42. As the pressure builds up in space 42, the diaphragm mid-portion 38 is urged downwardly against the action of coil spring 40. The coil spring is arranged so that when the bottom surface 39a of backing plate 39 is slightly above surface 41a of the well portion 41, the spring exerts a force on the water in the space 42 of approximately five pounds per square inch. As the water is withdrawn from space 42 and the coil spring 40 expands, the pressure decreases to approximately one pound per square inch at the upper limit of the movement of the diaphragm portion 38. The amount of water in the space 42 is visually indicated to the astronaut by a rod indicator 43 which extends downwardly from a depending flange portion 44 of the backing plate 39 through an opening 45 in the lower cup-shaped member 31.

Tanks 23 and 24 are interconnected by means of a conduit 46 connected at its lower end to a fitting 47 leading to tank 24 and the fitting 30a leading to tank 23. As shown in FIG. 3, fitting 47 is provided with a shutoff valve 48, and fitting 30a is provided with a shutoff valve 49. The shutoff valves 48 and 49 allow selective use of the tanks 23 and 24 individually or in parallel use together. The inlet pump 29 is connected to fitting 47 and thus conduit 46 by a short conduit 50. In addition to the visual indication of the quantity of water in the storage tanks provided by rod indicators 43, a pressure indication is provided by a pressure gauge 51 connected to conduit 46 at a fitting 52 in the mid-portion thereof. A valve 53 may be provided to selectively connect and disconnect the gauge 51 from the conduit 46. A pressure relief valve 54 may be provided on fitting 30a to relieve the system in case of excessive pressure such as during the initial charging of the system should the amount of water delivered to the storage tanks be sufficient to bottom the backing plate 39 on the well portion 41 of the respective storage tanks. For this purpose, the relief valve 54 may be adjusted to open at a pressure of approximately twenty or twenty-one pounds per square inch.

Fittings 30a and 47 serve both as the inlets to the storage tanks 23 and 24 and as the outlets therefrom as water is withdrawn from the system during the normal use thereof. In withdrawing water from the storage tanks, it is desired to effect a positive measured delivery therefrom, and to this end the cold water outlet comprises a positive displacement pump 26 disposed adjacent inlet 30a, thus communicating with conduit 46, and connected thereto by a short conduit 56. The construction of pump 26 may be best seen by reference to FIG. 6 wherein the pump is shown to comprise a tubular housing 57 having one end closed by a cover 58. A valve seat 59 is fixed within the housing 57 at a small distance from the cover 58 to define therebetween an inlet chamber 60 into which water is delivered from the conduit 56. A ball check 61 selectively closes a port 62 defined by the valve seat 59. The ball check 61 is biased by means of a coil spring 63 to control water flow from inlet chamber 60 through the port 62 into the pump chamber 64 defined by the right-hand end of the housing 57. Suitable O-ring seals 65 and 66 may be provided for sealing the cover and the valve seat respectively to the housing 57.

The outlet pump 26 further includes a piston 67 which is reciprocably slidable in the chamber 64 to effect a positive displacement pumping of the water from conduit 56 thereinto under the control of ball check 61. The piston is provided with a groove 68 which terminates short of the inner end thereof and into which a guide pin 69 extends from housing 57 to prevent rotation of the piston about its longitudinal axis and to limit the outward movement of the piston. A conventional O-ring 70 is carried on the inner end of the piston to provide a movable seal of the piston to the housing 57. A ball check 71 seats on a valve seat 72, as influenced by a spring 72a, at the inner end 73 of an axial bore 74 in piston 67 to permit flow of the water outwardly from chamber 64 through an outlet 75 of the pump 26 upon a leftward movement of the piston as seen in FIG. 6. The valve seat 72 is retained in the bore by means of a screw insert 76. As shown in FIG. 6, spring 63 biases ball check 61 and spring 72a biases ball check 71 to the closed position against the pressure of the water in the tanks produced by springs 40.

Thus, when it is desired to dispense a quantity of water from the storage tank, the astronaut merely reciprocates the piston 67. As the piston moves to the right, as seen in FIG. 6, the ball check 61 is unseated by the pressure in storage tanks 23 and 24 and the ball check 71 is seated on seat 72, permitting water to be withdrawn from the storage tanks through conduit 56 and into chamber 64. Upon a subsequent leftward movement of the piston 67, the ball check 61 seats on seat 62 and the ball check 71 becomes unseated from seat 72, permitting the water to be displaced from chamber 64 through bore 74 and outwardly through outlet 75. If the astronaut wishes to obtain water from the storage tank for drinking purposes, he merely places a suitable plastic, flexible nipple 77 over the outlet 75 and pumps a quantity of water thereinto. After removing the nipple 77 from the outlet 75, he then places his mouth over the nipple so that the water is forced directly into his mouth, precluding dispersion of the water into the space vehicle atmosphere which might otherwise occur under zero gravity conditions. Alternatively, the outlet 75 may be connected directly to a receptacle (not shown) containing foodstuffs and the like so that the water may be pumped directly into the container, again precluding dispersion of the water droplets in the atmosphere.

As shown in FIG. 3, the hot water tank 25 is provided with a similar outlet pump 27 permitting the hot water to be pumped from the hot water tank 25 in a similar manner when desired. Pressure is maintained in the hot water tank 25 by means of a conduit 78 which connects to inlet fitting 30a, and thus conduit 46, and to the bottom of tank 25 at an inlet fitting 79. Adjacent the fitting 79, the conduit 78 is provided with a loop 80 to allow for expansion of hot water to prevent hot water from expanding to the cold water outlet pump as during the initial heating of the water subsequent to the charging of the system. The hot water tank 25 may comprise a generally conventional hot water tank having a plurality of heating elements 81 in embracing relationship to the tank wall 82. The invention comprehends the provision of a first thermostat control 83 of the immersion type which extends through the tank wall 82 to sense the temperature of the water within the tank and regulate the energization from the space vehicle electrical system of the heating coils 81 to maintain a preselected temperature. It is desirable in the space kitchen application to provide two identical sets of separately controlled heating elements 81 to assure that the water heater will always be able to supply hot water. In the illustrated embodiment, the space vehicle is maintained at approximately one-half atmosphere and, thus, the water in the hot water tank is limited to a temperature of 179° F., to preclude boiling of the water at the reduced pressure. In addition to the thermostatic control 82, the hot water tank is provided with a second thermostatic control 84 (more than one can be used) which is mounted on the tank wall to sense the temperature of the tank wall and control the energization of the heating coils 81.

More specifically, at zero gravity conditions, the normal convection currents of the water are not induced by heating of different portions thereof and, thus, overheating of different portions of the tank wall 82 may occur. Thus, the thermostatic control 84 senses the temperature of the tank wall rather than the temperature of the water to preclude undesirable overheating thereof notwithstanding the presence of the water within the tank. As shown in FIG. 3, the hot water tank 25 may be provided with an insulative jacket to effectively preclude heat loss from the hot water tank, which is thusly arranged to maintain the water at approximately 179° F. at all times, so that it is instantly available for delivery from outlet pump 27 when desired.

As indicated briefly above, subsequent to the initial charging of the water system 22, it may be necessary to recharge the system with water as from a waste recovery system. The water transfer tank 28, as shown in FIG. 5, includes a lower upwardly opening cup-shaped housing 86 and an upper downwardly opening cup-shaped housing 87. A diaphragm designated 88 extends across the interior of the water transfer tank and includes an outer peripheral portion 89 sealingly clamped between coacting flanges 90 and 91 of the lower and upper cup-shaped members 86 and 87 respectively. The diaphragm 88 further includes an elongated connecting portion 92 and a mid-portion 93 supported by a backing plate 94 which is urged downwardly by a coil spring 95 to vary the volume and pressurize the water in the resultant space 96 below diaphragm 88. The coil spring 95 is seated in a well 97 at the upper end of the upper cup-shaped member 87 which is also provided with a bushing 98 slidably receiving a guide rod 99 carried by the framework 100 of the space kitchen 10. A handle 101 is provided at the front upper end of the upper cup-shaped member 87 for use in carrying the water transfer tank and also for use in vertically reciprocating the water transfer tank to effect a pumping operation when the water transfer tank is installed as shown in FIG. 3. The inlet pump 29 is generally similar to the outlet pumps 26 and 27 except that an outlet 102 is provided at the lower end of the pump 29 for connection to the conduit 50 and a quick connect coupling 103 is provided at the inlet end of the pump 29 for facilitated connection thereto of the water transfer tank 28. During the placement of the transfer tank 28 into the position shown in FIG. 3, the guide rod 99 is moved upwardly against the action of a spring retainer 104 to permit the lower end of the rod to clear the bushing 98 and allow its insertion therethrough to pass downwardly to the position of FIG. 5. The quick connect coupling 103 is arranged to provide a quick convenient connection of the transfer tank 28 to the pump 29 and prevent introduction of air into the system. When the transfer tank 28 is installed as shown in FIG. 3, the astronaut vertically reciprocates the tank to effect a pressure pumping of the water from the tank through pump 29 into the water supply system 22. Thus, when the transfer tank 28 is raised, a quantity of water, herein approximately two ounces, is delivered from the tank 28 into the pump 29. When the transfer tank 28 is subsequently moved downwardly, the two ounces of water in the pump 29 is resultingly forced outwardly therefrom through fitting 102 into conduits 50 and 46 and thence to the storage tanks 23 and 24. The transfer tank 28 is provided with an indicator rod 105 which is connected to the backing plate 94 so as to indicate the quantity of water within the tank at all times. Thus, when the astronaut sees that the water has been completely transferred from the water transfer tank 28 to the water supply system, he merely disconnects the coupling 103, raises the guide rod 99 and removes the water transfer tank 28 from the position of FIG. 3. The water transfer tank 28 may then be stored for subsequent use as shown in FIG. 2.

The method of charging the transfer tank 28 from the waste recovery system is almost identical to the system for charging the storage tanks 23 and 24 except that the valves in the pump used to charge the transfer tank are reversed with respect to the valves in the inlet pump 29 so that the reciprocating movement of the tank serves to charge the tank from the waste recovery system.

Water supply system 22 is further provided with improved means for precluding inadvertent dispensing of water by an accidental operation of the outlet pumps 26 or 27. More specifically, as shown in FIGS. 6 and 7, the outlet end of the piston 67 is provided with a valve 106 which is controlled by a push button 107. The push button is urged downwardly by a coil spring 108 acting between the piston 67 and a spring retainer 109 carried by the push button so as to bias the valve 106 to the closed position. Thus, unless push button 107 is manually depressed to open the bore 74 to outlet 75, water can not pass from chamber 64 to the outlet. As a result, the astronaut must consciously depress the push button 107 while concurrently effecting the pumping reciprocation of the piston in the housing 57 to effect a delivery of water through the outlet 75.

Thus, water supply system 22 provides an improved selective delivery of either hot or cold water under a wide range of gravity and air pressure conditions, including zero gravity conditions. A positive pressure is provided in the water system at all times. The system is arranged for facilitated recharging when necessary and both the inlet and outlet devices associated therewith are arranged to effectively preclude dispersion of water from the system into the surrounding atmosphere. The hot water tank of the system is arranged for improved safe heating of the water notwithstanding the use thereof under zero gravity conditions wherein convection thermal transfer is effectively precluded. The system is extremely simple and lightweight while yet providing utmost reliability and convenience. As the different elements of the system are connected by conduits, substantial uniformity of water pressure is provided at all points in the system at all times.

While we have shown and described one embodiment of our invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. A water supply system for use in space vehicles and the like, comprising: a closed storage tank; a closed heating tank; means for pumping water under pressure into said storage tank; a conduit connecting said tanks; means actuated by the pressure of water pumped into said water system for maintaining pressure in said water system and for causing water to pass from said storage tank through said conduit to said heating tank as water is withdrawn from said heating tank; and means for selectively pumping water from said tanks.

2. The water supply system of claim 1 wherein said means for pumping water from said tanks comprises positive displacement pump means.

3. The water supply system of claim 1 wherein said conduit is substantially unrestricted to provide substantial uniformity of water pressure at all points in the system.

4. The water supply system of claim 1 wherein said means for pumping water into the storage tank comprises a manually operable positive displacement pump.

5. A water supply system for use in space vehicles and the like, comprising: a pair of closed storage tanks; a closed heating tank; means for pumping water under pressure simultaneously into said storage tanks and said heating tank; a conduit interconnecting said tanks; means actuated by the pressure of water pumped into said storage tanks for maintaining pressure in said water system and for causing water to pass concurrently from said storage tanks through said conduit to said heating tank as water is withdrawn from said heating tank; and means at one of said storage tanks and said heating tank for pumping water selectively from said tanks.

6. A water supply system for use in space vehicles and the like, comprising: a closed storage tank; a closed heating tank; means for pumping water into said storage tank; a conduit connecting said tanks; means actuated by the pressure of water pumped into said storage tank for maintaining pressure in said water system and for causing water to pass from said storage tank through said conduit to said heating tank as water is withdrawn from said heating tank; means for pumping water selectively from said tanks; and a receptacle secured to said means for pumping water from the tank for precluding dispersion to the space vehicle atmosphere of the water pumped by said pumping means.

7. The water supply system of claim 6 wherein said receptacle is removably secured to said means for pumping water from said tanks.

8. The water supply system of claim 6 wherein said receptacle is flexible.

9. A water supply system for use in space vehicles and the like, comprising: a closed storage tank; a closed heating tank; means for pumping water under pressure simultaneously into said storage tank and said heating tank; a conduit connecting said tanks; means actuated by the pressure of water pumped into said storage tank for maintaining pressure in said water system and for causing water to pass therefrom through said conduit to said heating tank as water is drawn therefrom; and means for pumping water from said tanks including a first positive displacement pump at said storage tank for pumping cold water and a second positive displacement pump at said heating tank for pumping heated water, each of said pumps being provided with manually operable push button means for permitting operation of the pump only when depressed.

References Cited in the file of this patent
UNITED STATES PATENTS

| | | |
|---|---|---|
| 2,320,671 | Stavely | June 1, 1943 |
| 2,801,320 | Prindle | July 30, 1957 |
| 2,801,321 | Prindle | July 30, 1957 |
| 2,960,122 | Fuller | Nov. 15, 1960 |